US007907918B2

(12) United States Patent
Aoike

(10) Patent No.: US 7,907,918 B2
(45) Date of Patent: Mar. 15, 2011

(54) PORTABLE TERMINAL DEVICE, DISPLAY METHOD FOR LIST OF PARTICIPANTS USED THEREIN, AND PROGRAM FOR THE SAME

(75) Inventor: Toru Aoike, Tokyo (JP)

(73) Assignee: NEC Corporation, Tokyo (JP)

( * ) Notice: Subject to any disclaimer, the term of this patent is extended or adjusted under 35 U.S.C. 154(b) by 502 days.

(21) Appl. No.: 12/093,627

(22) PCT Filed: Nov. 13, 2006

(86) PCT No.: PCT/JP2006/322525
§ 371 (c)(1),
(2), (4) Date: May 14, 2008

(87) PCT Pub. No.: WO2007/058135
PCT Pub. Date: May 24, 2007

(65) Prior Publication Data
US 2009/0264085 A1  Oct. 22, 2009

(30) Foreign Application Priority Data

Nov. 16, 2005 (JP) ................. 2005-330952

(51) Int. Cl.
*H04B 1/38* (2006.01)
(52) U.S. Cl. ..... 455/90.2; 455/518; 455/519; 455/550.1
(58) Field of Classification Search ............... 552/90.2, 552/518, 519, 452.1, 414.1, 420, 425, 407, 552/9, 552.1, 556.1, 41.2, 412, 73, 564, 550.1, 552/566; 370/260, 340
See application file for complete search history.

(56) References Cited

U.S. PATENT DOCUMENTS

| 6,628,767 | B1 | 9/2003 | Wellner et al. |
| 2003/0078064 | A1* | 4/2003 | Chan .............................. 455/514 |
| 2003/0125016 | A1* | 7/2003 | Tsuchiyama ................. 455/412 |

(Continued)

FOREIGN PATENT DOCUMENTS

CN 1492705 A 4/2004

(Continued)

OTHER PUBLICATIONS

Supplementary European Search Report for EP 06 83 2537 completed Feb. 23, 2010.

(Continued)

*Primary Examiner* — Tan Trinh

(57) ABSTRACT

A participant list display method is provided in which, when referring to status and details of a participant with many utterances, it is possible to reduce effort required in page turning or scrolling operations. In step S1 a mobile telephone performs utterance processing for a participant in PTT communication, to perform PTT starting processing; in step S2, a variable is acquired in working memory for counting number of utterances for each participant; and in step S3 a state of waiting to obtain a right to speak is entered. In the mobile telephone, from the state of waiting to obtain the right to speak, when a party who wishes to speak obtains the right to speak in step S4, a count of number of utterances for the participant that is stored in the working memory is incremented in step S5. The mobile telephone refers to the number of utterances for each participant stored in the working memory, and sorts the list of participants displayed on the display unit, in order of number of utterances.

21 Claims, 4 Drawing Sheets

U.S. PATENT DOCUMENTS

| | | | |
|---|---|---|---|
| 2005/0088981 A1* | 4/2005 | Woodruff et al. | 370/260 |
| 2005/0143135 A1* | 6/2005 | Brems et al. | 455/564 |
| 2006/0129409 A1* | 6/2006 | Mizutani et al. | 704/275 |
| 2009/0092116 A1* | 4/2009 | Jiang et al. | 370/340 |
| 2010/0178869 A1* | 7/2010 | Mauney et al. | 455/41.2 |

FOREIGN PATENT DOCUMENTS

| | | |
|---|---|---|
| CN | 1611086 A | 4/2005 |
| JP | 04339484 A | 11/1992 |
| JP | 06164742 A | 6/1994 |
| JP | 06303324 A | 10/1994 |
| JP | 09200350 A | 7/1997 |
| JP | 2002536928 A | 10/2002 |
| JP | 2003526275 A | 9/2003 |

OTHER PUBLICATIONS

International Search Report for PCT Application No. PCT/JP2006/322525 mailed Dec. 19, 2006.

Chinese Office Action for CN200680043059.2 issued Jul. 14, 2010.

* cited by examiner

FIG. 2A
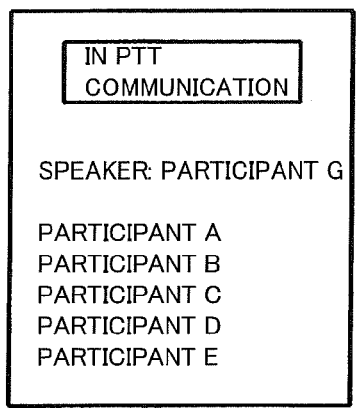
FIG. 2B
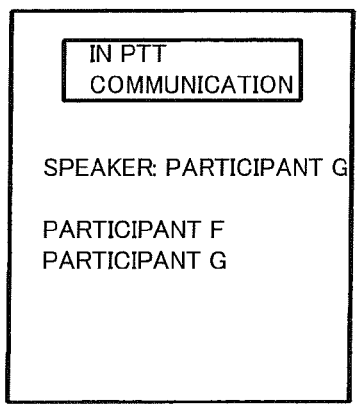
FIG. 2C
| PARTICIPANT LIST | NUMBER OF UTTERANCES |
|---|---|
| PARTICIPANT A | 5 |
| PARTICIPANT B | 3 |
| PARTICIPANT C | 1 |
| PARTICIPANT D | 1 |
| PARTICIPANT E | 1 |
| PARTICIPANT F | 1 |
| PARTICIPANT G | 1 |

FIG. 3A
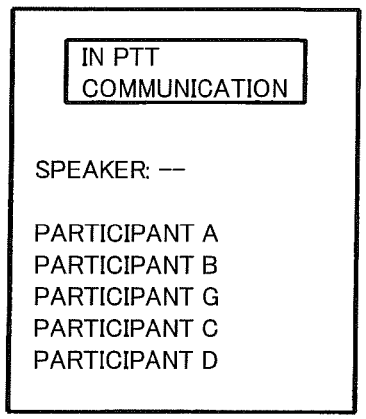
FIG. 3B
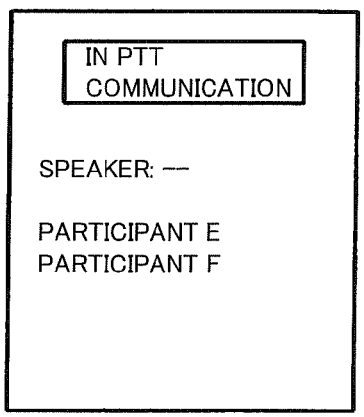
FIG. 3C
| PARTICIPANT LIST | NUMBER OF UTTERANCES |
|---|---|
| PARTICIPANT A | 5 |
| PARTICIPANT B | 3 |
| PARTICIPANT C | 1 |
| PARTICIPANT D | 1 |
| PARTICIPANT E | 1 |
| PARTICIPANT F | 1 |
| PARTICIPANT G | 2 |

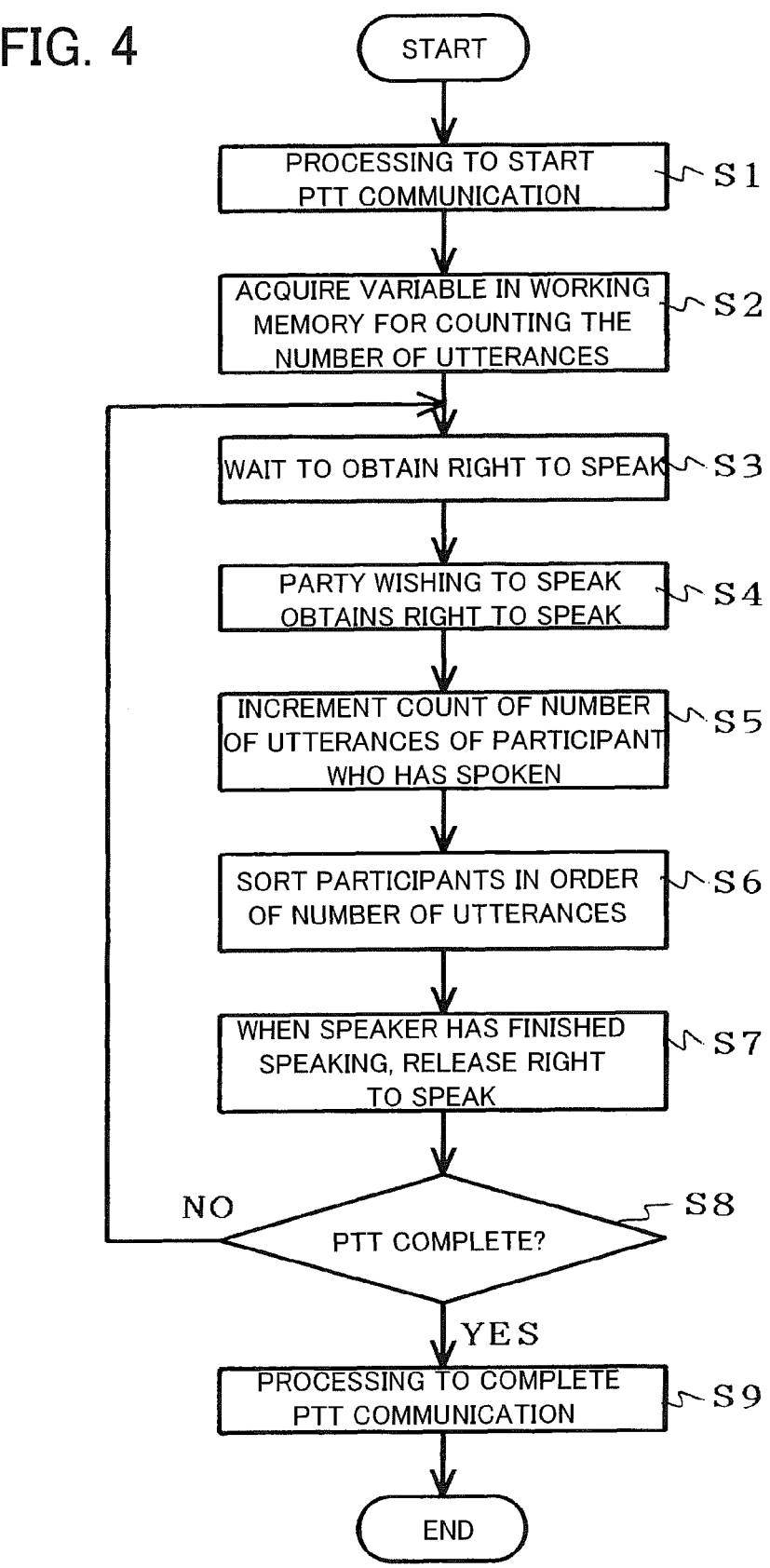

PORTABLE TERMINAL DEVICE, DISPLAY METHOD FOR LIST OF PARTICIPANTS USED THEREIN, AND PROGRAM FOR THE SAME

TECHNICAL FIELD

The present invention relates to a portable terminal device, a display method for participants used therein, and a program therefor, and in particular, to a portable terminal device in which a PTT (Push to Talk) communication function is installed.

BACKGROUND ART

In recent years, portable terminal devices such as mobile telephones, PHSs (Personal Handyphone Systems), PDAs (Personal Data Assistance, Personal Digital Assistants: personal portable information communication devices), and the like, in which wireless communication is possible, include devices in which a PTT communication function is installed (for example, refer to Patent Documents 1 and 2).

Here, the PTT is a walkie-talkie type of device using IP (Internet Protocol), and conversation is one-way. Furthermore, with the PTT, parties being spoken to can be grouped, as in IM (Instant Messaging) and it is possible to view a state of the party to be spoken to (termed "another party").

Therefore, in the PTT, it is possible to select another party (an individual or a group) who is in a conversation state, and press a conversation button (or a PTT button or the like) to speak. That is, the PTT is a transceiver mode for a portable telephone; there is no necessity to dial a number of another party, time to connect is short, and it is possible to converse with a plurality of locations simultaneously. In conversation in such cases, speech is transmitted all at once from an individual having a right to speak, to another party in a conversation state, and the other party in the conversation state receives and listens to the speech.

In the PTT, charges are often set lower than normal. Furthermore, in an operation procedure, a conversation partner list prepared separately from a normal telephone book is opened, selection of the other party is determined, and conversation takes place by pressing a conversation button (or a PTT button or the like). At this time, if a plurality of conversation partners is selected, conversation takes place with multiple locations.

[Patent Document 1] Japanese Patent Kohyo Publication No. JP-P2002-536928A

[Patent Document 2] Japanese Patent Kohyo Publication No. JP-P2003-526275A

DISCLOSURE OF THE INVENTION

Problems to be Solved by the Invention

However, in the conventional portable terminal device as described above, there is a limit to the size of a display screen thereof, and when PTT communication with a large number of participants is carried out, in cases in which status and details of each participant are displayed, page turning and scrolling operations increase, which is inconvenient.

The participant list has a fixed display in alphabetic order or in the order of the Japanese syllabary (A-I-U-E-O), and in cases in which participants who speak a lot are displayed towards the bottom of the screen or on a following page, there is a problem of inconvenience.

Thus it is an object of the present invention solve the abovementioned problems, and to provide a portable terminal device, a display method for a list of participants that is used in the device, and a program therefor, in which effort involving in page turning or scrolling operations can be reduced.

Means to Solve the Problems

A portable terminal device according to the present invention is provided with a PTT (Push to Talk) function that performs transmission all at once of at least speech data from a participant who has a right to speak, to another participant listed in a participant list, the device being provided with a counting unit which counts the number of utterances for each participant in the participant list when communication is performed by the PTT function; a sorting unit which sorts display order when displaying the participant list in order of number of utterances based on the count information, and a display unit which displays the participant list in the sorted order.

A participant list display method according to the present invention is a participant list display method used in a portable terminal device provided with a PTT (Push to Talk) function for performing transmission all at once of at least speech data from a participant who has a right to speak, to another participant listed in a participant list, the method including a first process in which the portable terminal device counts the number of utterances for each participant in the participant list when communication is performed by the PTT function; a second process of sorting display order when displaying the participant list in order of number of utterances based on the count information, and a third process of displaying the participant list in the sorted order.

A program for the participant list display method according to the present invention is a program for a participant list display method used in a portable terminal device provided with a PTT (Push to Talk) function for performing transmission all at once of at least speech data from a participant who has a right to speak, to another participant listed in a participant list, the program making a computer of the portable terminal device execute: a process of counting the number of utterances for each participant in the participant list when communication is performed by the PTT function; a process of sorting display order when displaying the participant list in order of number of utterances based on the count information, and a process of displaying the participant list in the sorted order.

That is, the portable terminal device of the present invention is a device provided with a PTT (Push to Talk) function and is distinguished by reduction of page turning or scrolling operations by counting the number of utterances for each speaker when PTT communication is being performed, and sorting the list of participants on a display screen in order of number of utterances using the count information, to realize an improvement in user interface.

To explain more specifically, the portable terminal device of the present invention is provided with a unit which performs various types of setting and input, and requests to speak during PTT communication, a CPU (central processing unit) which performs control of various parts inside the device, a unit which displays content of the various types of setting, a list of PTT participants, a communication state, and the like, a unit which counts the number of utterances, a transmitter which receives an incoming communication wirelessly and performs conversation and PTT communication, a microphone for conversing and speaking by the PTT communication, and a speaker for making the sound of a melody, a voice, or the like.

In this way, in the portable terminal device of the present invention, since persons who have made many (or most frequent) utterances are displayed on a first page, when referring to status and details of participants who have frequent utterances, it is possible to reduce effort required in page turning or scrolling operations. Furthermore, in the portable terminal device of the present invention since persons who have many (frequent) utterances are displayed in an upper position, when performing conferences or the like by PTT communication, an opportunity (or motivation) is provided so that participants can speak without hesitation.

Meritorious Effects Of The Invention

The present invention, by the abovementioned type of structure and operation, provides an effect by which effort required in page turning or scrolling operations can be reduced when referring to status or other details of participants who make many utterances.

BRIEF DESCRIPTION OF THE DRAWINGS

FIG. 2A and 2B are diagrams showing a display example of a participant list when performing PTT communication to a display unit of FIG. 1; FIG. 2C is a diagram showing contents stored in a working memory of FIG. 1.

FIG. 3A and 3B are diagrams showing a display example of a participant list when performing PTT communication to the display unit of FIG. 1; FIG. 3C is a diagram showing contents stored in the working memory of FIG. 1.

FIG. 4 is a flow chart showing PTT communication processing of the mobile telephone according to an example of the present invention.

EXPLANATION OF REFERENCE NUMERALS

Figure 1:
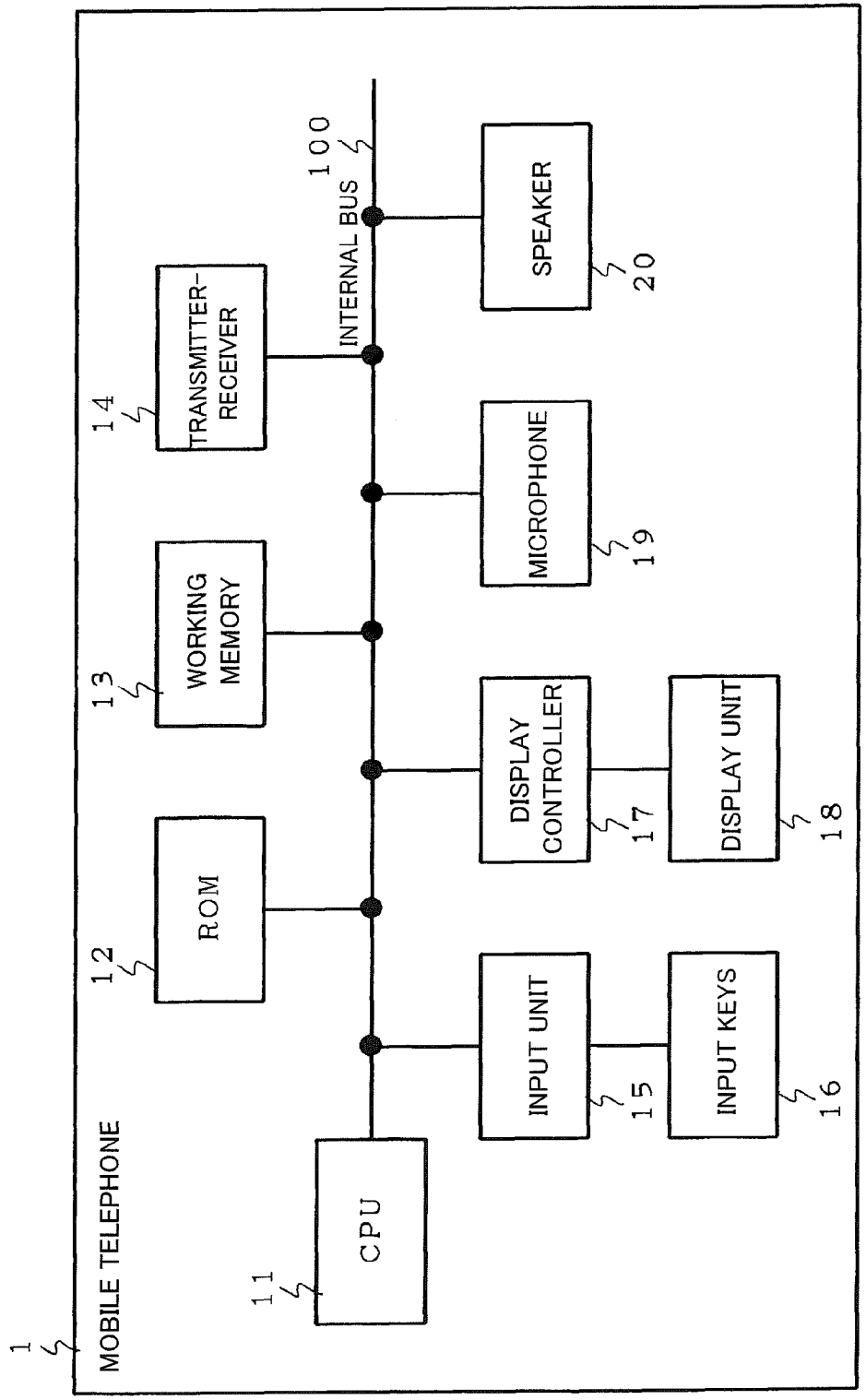
FIG. 1 is a block diagram showing a configuration of a mobile telephone according to an example of the present invention.

1 Mobile Telephone
11 CPU
12 ROM
13 Working Memory
14 Transmitter-Receiver Unit
15 Input Unit
16 Input Keys
17 Display Controller Unit
18 Display Unit
19 Microphone
20 Speaker
100 Internal Bus

PREFERRED MODES FOR CARRYING OUT THE INVENTION

First Example

Next, a first example of the present invention will be explained, making reference to the drawings. FIG. 1 is a block diagram showing a configuration of a mobile telephone according to an example of the present invention. In FIG. 1, the mobile telephone 1 is composed of a CPU (Central Processing Unit) 11, a ROM (Read Only Memory) 12, a working memory 13, a transmitter-receiver unit 14, an input unit 15, input keys 16, a display controller unit 17, a display unit 18, a microphone 19, and a speaker 20.

The CPU 11 is installed in the mobile telephone 1, and the CPU 11 is connected to each part inside a device via an internal bus 100. Among these, the ROM 12 stores fixed data such as various types of control programs and the like to be executed by the CPU 11. The working memory 13 is composed of RAM (Random Access Memory), and is arranged to store temporary data necessary for the CPU 11 to execute the programs. Data of number of utterances for each speaker are also stored in this working memory 13.

The transmitter-receiver 14 is a circuit which handles incoming communication (receiving), outgoing communication (call), and conversation. The input unit 15 is a circuit which detects key input from the input keys 16. When an utterance is made in PTT (Push to Talk) communication, it is necessary to press or push continuously a prescribed key (dedicated key, off-hook key, or the like), among the input keys 16, and obtain a right to speak.

The display controller unit 17 is a control circuit which controls a display of the display unit 18. The display unit 18 is disposed on a front face of the device main unit, not shown in the drawings, and is a display device such as a black-and-white or color liquid crystal panel or is organic EL (Electro Luminescence). The microphone 19 is a device for transmitting speech, and the speaker 20 is a device for making the sound of a melody, a voice, a confirmation sound, or the like.

FIGS. 2A, 2B and FIGS. 3A, 3B are diagrams showing a display example of a participant list when performing PTT communication to the a display unit 18 of FIG. 1; and FIG. 2C and FIG. 3C are diagrams showing contents stored in the working memory 13 of FIG. 1.

In a state in which several utterances have been made already in PTT communication by 7 participants (participant A to G), FIG. 2A and FIG. 2B represent the fact that in one example displayed in the display unit 18, among the 7 participants the first 5 participants (participant A to E) are displayed on a first page (refer to FIG. 2A), and the remaining 2 participants (participant F and G) are displayed on a second page (refer to FIG. 2B).

As shown in the abovementioned FIG. 2A and FIG. 2B, FIG. 2C represents a list of number of utterances for each participant stored in the working memory 13 when the participant list is displayed on the display unit 18.

In FIG. 2C, the number of utterances by participant A is "5", the number of utterances by participant B is "3", the number of utterances by participant C is "1", the number of utterances by participant D is "1", the number of utterances by participant E is "1", the number of utterances by participant F is "1", and the number of utterances by participant G is "1"; and in the participant list shown in FIG. 2A and FIG. 2B, the participants A to G are shown sorted in order of number of utterances.

FIG. 3A and FIG. 3B represent a screen of the display unit 18, after sorting in order according to the number of utterances, from the abovementioned FIG. 2A and FIG. 2B, after participant G has made 1 utterance. Among the 7 participants the first 5 participants (participant A, B, G, C, D) are displayed on a first page (refer to FIG. 3A), and the remaining 2 participants (participant E, F) are displayed on a second page (refer to FIG. 3B).

As shown in the abovementioned FIG. 3A and FIG. 3B, FIG. 3C represents a list of number of utterances for each participant stored in the working memory 13 when the participant list is displayed on the display unit 18.

In FIG. 3C, the number of utterances by participant A is "5", the number of utterances by participant B is "3", the number of utterances by participant C is "1", the number of utterances by participant D is "1", the number of utterances by participant E is "1", the number of utterances by participant F is "1", and the number of utterances by participant G is "2"; and in the participant list shown in FIG. 3A and FIG. 3B, the participants A to G are shown sorted in order of number of utterances.

FIG. 4 is flow chart showing PTT communication processing of the mobile telephone 1 according to the example of the present invention. In FIG. 4, the number of utterances is counted from starting of the PTT communication of the mobile telephone 1 according to the present example, and processing of sorting the participant list, up to completion of the PTT communication is shown. Referring to these FIGS. 1 to 4, the PTT communication processing of the mobile telephone 1 according to the example of the present invention is explained. Moreover, the processing shown in FIG. 4 implements execution by the CPU 11 of the programs stored in the ROM 12.

By the mobile telephone 1 performing communication processing for the PTT communication participants set (detected) in advance, PTT start processing is performed (step S1 in FIG. 4), a variable is acquired in the working memory 13 for counting the number of utterances of each participant (step S2 in FIG. 4), and a state of waiting to obtain the right to speak is entered (step S3 in FIG. 4).

In the mobile telephone 1, from the state of waiting to obtain for the right to speak, when a party who wishes to speak obtains a right to speak (step S4 in FIG. 4), the CPU 11 increments the count of the number of utterances of a relevant participant sorted in the working memory 13 (step 5 in FIG. 4). The CPU 11 refers to the number of utterances of each participant stored in the working memory 13, and sorts, in order of larger number of utterances, the list of participants displayed on the display unit 18 (step S6 in FIG. 4).

In the mobile telephone 1, when a speaker has finished speaking and the right to speak is released (step S7 in FIG. 4), if the PTT communication is not complete (step S8 in FIG. 4), a state of waiting to obtain the right to speak is entered again (step S3 in FIG. 4), but if the PTT communication is complete (step S8 in FIG. 4), processing to end the PTT communication (step S9 in FIG. 4) is performed and the abovementioned processing is complete.

In this way, in the present example, with regard to the participant list shown in the display unit 18, since it is arranged that the participants who make a large number of utterances are displayed on the first page, when referring to the status or details of the participants who make many utterances, it is possible to reduce the effort required in page turning or in scrolling operations.

Furthermore, in the present example, with regard to the participant list shown in the display unit 18, since it is arranged that participants who make many utterances are displayed in an upper position, when having a meeting or the like with PTT communication, an opportunity is obtained so that participants can speak without hesitation.

Furthermore, in the present invention, cases of transmission from the mobile telephone 1 have been explained in the abovementioned example, but in the same way, in cases of transmission from other participants also, by sorting the order of participants in a participant list based on the number of utterances, an effect similar to that described above can be obtained.

In the present invention, an explanation has been given of cases in which the list of participant extends over a plurality of pages in the abovementioned example, but in the same way, in cases in which the list of participants is contained in a single page also, by sorting the order of participants in a participant list based on the number of utterances, an effect similar to that described above can be obtained.

Second Example

In the first example described above, an explanation has been given where the mobile telephone 1 sorts the order of participants in a participant list based on the number of utterances, but operation is also possible in which sorting is done such that the previous speaker is invariably at the head. A mobile telephone according to a second example of the present invention performs sorting based on the number of utterances, as well as displaying a participant list in which the previous speaker is invariably at the head. According to the present example, it is possible to immediately confirm the previous speaker, from the head position of the participant list.

Third Example

In the first example described above, an explanation has been given where the mobile telephone 1 only sorts the order of participants in a participant list based on the number of utterances, but it is also possible to change the name of a participant with most (or participants frequent) utterances to a prescribed color (for example, a red color or the like). A mobile telephone according to a third example of the present invention performs sorting based on the number of utterances, as well as displaying a participant list in which the name of the participant with most frequent utterances is changed to a prescribed color. According to the present example, it is possible to easily confirm the participant with most frequent utterances.

Fourth Example

In the abovementioned first example, an explanation has been given where the mobile telephone 1 only sorts the order of participants in a participant list based on the number of utterances, but it is also possible to display a participant or participants with most frequent utterances with a prescribed icon or image (for example, an icon that indicates many utterances, or an image linked to the person). A mobile telephone according to a fourth example of the present invention performs sorting based on the number of utterances, as well as displaying a participant list in which the prescribed icon, the image, or the like, is displayed for the participant(s) with most utterances. According to the present example, it is possible to easily confirm the participant(s) with most utterances.

Fifth Example

In the abovementioned first example, an explanation has been given where the mobile telephone 1 performs "incrementing a count of the number of utterances", and "sorting the participants" before the right to speak is released, but this may be performed also after release of the right to speak. A mobile telephone according to a fifth example of the present invention performs the count and sorting after release of the right to speak, and displays the participant list. According to the present example, the participant list is updated and displayed, at timing after release of the right to speak.

Sixth Example

In the abovementioned first example, an explanation has been given for when a setting is not provided concerning the fact that the mobile telephone 1 performs sorting of the participants in the participant list based on the number of utterances, but a setting as to whether or not sorting is performed may be provided, and a user of the mobile telephone 1 may make a selection thereof. A mobile telephone according to a sixth example of the present invention may be able to perform setting as to whether or not the abovementioned method of sorting the participant list, and various forms of display or the like accompanying the method, are performed. According to the present example, it is possible to make a user of the mobile telephone 1 select a display mode of the participant list.

Seventh Example

In the abovementioned first example, an explanation has not been given concerning where the mobile telephone 1 displays the number of utterances itself for each participant, but the number of utterances or a graph of the number of utterances may be displayed on the display unit 18. A mobile telephone according to a seventh example of the present invention displays either of the number of utterances of each participant and a graph of the number of utterances. According to the present example, it is possible to make a user of the mobile telephone 1 select a display mode of the participant list. According to the present example, an effect is obtained in that the number of utterances of each participant is displayed in the participant list, and an opportunity is obtained so that participants can speak without hesitation (i.e., positively).

INDUSTRIAL APPLICABILITY

The present invention can be applied to devices in which a PTT communication function is installed in a portable terminal device such as, outside of mobile telephones, a PHS (Personal Handyphone System), PDA (Personal Data Assistance, Personal Digital Assistants: personal portable information communication devices), and the like.

The invention claimed is:

1. A portable terminal device in which a PTT (Push to Talk) function is installed, the device comprising:
   a counting unit which counts number of utterances for each participant when communication is performed by the PTT function;
   a sorting unit which sorts display order when displaying a participant list in order of number of utterances based on the count information; and
   a display unit which displays the participant list in the sorted order.

2. The portable terminal device according to claim 1, wherein said PTT (Push to Talk) function performs transmission all at once of at least speech data from a participant who has a right to speak, to another participant in a participant list, and
   said counting unit counts number of utterances for each participant in the participant list when communication is performed by the PTT function.

3. The portable terminal device according to claim 1, wherein
   the sorting unit performs sorting of display order such that a participant who spoke the previous time is invariably at the head, when displaying the participant list.

4. The portable terminal device according to claim 1, wherein
   the display unit displays name(s) of participant(s) with many utterances by a prescribed color.

5. The portable terminal device according to claim 1, wherein
   the display unit displays name(s) of participant(s) with many utterances by at least one of a prescribed graphic form and image.

6. The portable terminal device according to claim 1, wherein
   the counting unit and the sorting unit perform the counting and the sorting either before release or after release of the right to speak.

7. The portable terminal device according to claim 1, wherein
   setting is possible as to whether or not sorting is performed by the sorting unit.

8. The portable terminal device according to claim 1, wherein
   the display unit displays either of number of utterances and a graph of the number of utterances for each participant.

9. The portable terminal device according to claim 1, wherein
   the portable terminal device is at least one of a mobile telephone, a PHS (Personal Handyphone System), and a PDA (Personal Data Assistance, Personal Digital Assistants).

10. A participant list display method used in a portable terminal device in which a PTT (Push to Talk) function is installed, the method comprising:
    a first process in which the portable terminal device counts number of utterances for each participant when communication is performed by the PTT function;
    a second process of sorting display order when displaying the participant list in order of number of utterances based on the count information; and
    a third process of displaying the participant list in the sorted order.

11. The participant list display method according to claim 10, wherein the PPT function performs transmission all at once of at least speech data from a participant who has a right to speak, to another participant in a participant list, and
    said first process counts number of utterances for each participant in the participant list when communication is performed by the PTT function.

12. The participant list display method according to claim 10, wherein
    in the second process, display order is sorted such that a participant who spoke the previous time is invariably at the head, when displaying the participant list.

13. The participant list display method according to claim 10, wherein
    in the third process, name(s) of participant(s) with many utterances is displayed by a prescribed color.

14. The participant list display method according to claim 10, wherein
    in the third process, the name(s) of participant(s) with many utterances is displayed together with at least one of a prescribed graphic form and image.

15. The participant list display method according to claim 10, wherein
    the first process and the second process are performed either before release or after release of the right to speak.

16. The participant list display method according to claim 10, wherein
    setting is possible as to whether or not to perform sorting of order of participants in the participant list according to the number of utterances, and when a selection is made to perform sorting, the first process to the third process are executed.

17. The participant list display method according to claim 10, wherein in the third process, either one of number of utterances and a graph of the number of utterances is displayed for each participant.

18. The participant list display method according to claim 10, wherein the portable terminal device is at least one of a mobile telephone, a PHS (Personal Handyphone System), and a PDA (Personal Data Assistance, Personal Digital Assistants).

19. A program for a portable terminal device in which a PTT (Push to Talk) function is installed, the program making a computer of the portable terminal device execute:

a process of counting number of utterances for each participant when communication is performed by the PTT function;

a process of sorting display order when displaying the participant list in order of number of utterances based on the count information; and a process of displaying the participant list in the sorted order.

20. The program according to claim 19, wherein the PPT function performs transmission all at once of at least speech data from a participant who has a right to speak, to another participant in a participant list, and said process of counting number of utterances counts number of utterances for each participant in the participant list when communication is performed by the PTT function.

21. A recording medium storing said program according to claim 19.

* * * * *